Jan. 7, 1969     D. W. DONOVAN     3,420,431
TRAY STRUCTURE
Filed Nov. 20, 1967                         Sheet 1 of 2
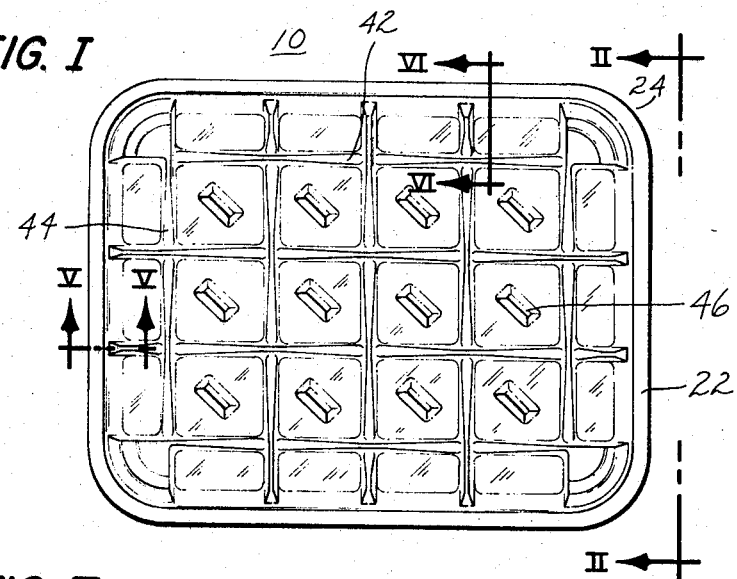
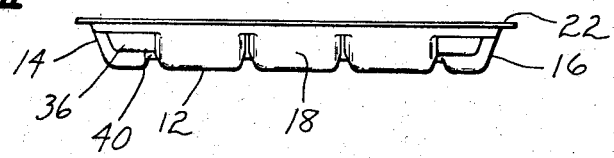
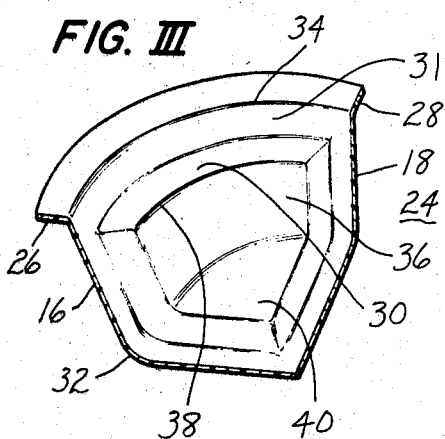
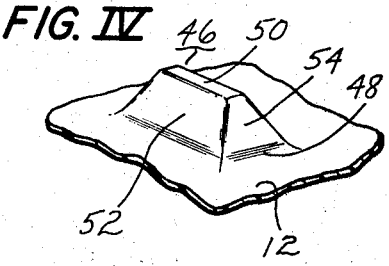
INVENTOR.
DONALD W. DONOVAN
BY
AGENT:

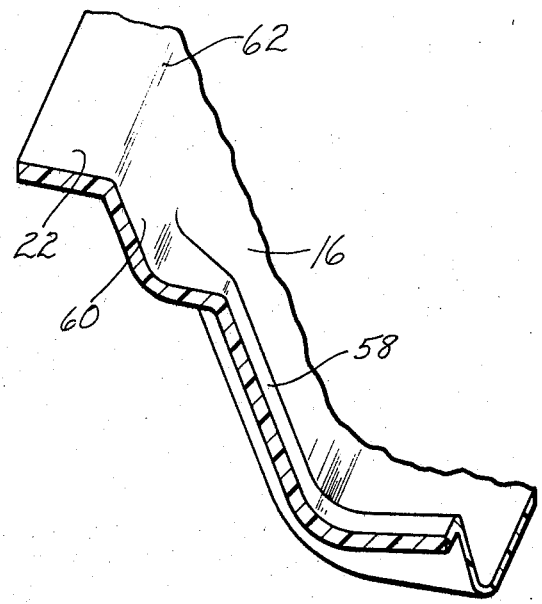
FIG. V
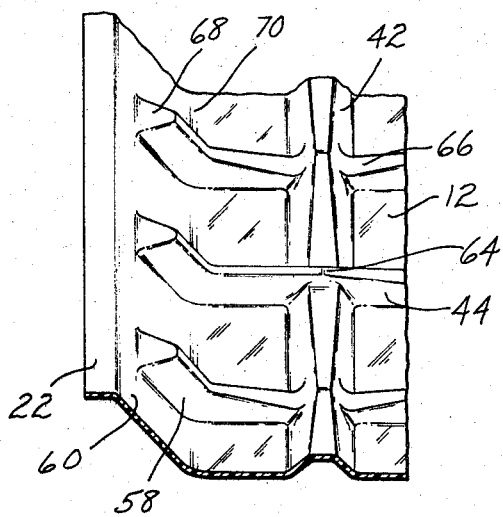
FIG. VI
INVENTOR.
DONALD W. DONOVAN
BY Michael J. Murphy
AGENT:

United States Patent Office 3,420,431
Patented Jan. 7, 1969

3,420,431
TRAY STRUCTURE
Donald W. Donovan, Glastonbury, Conn., assignor to Monsanto Company, St. Louis, Mo., a corporation of Delaware
Continuation-in-part of application Ser. No. 564,131, July 11, 1966. This application Nov. 20, 1967, Ser. No. 684,417
U.S. Cl. 229—2.5  13 Claims
Int. Cl. B65d 1/36

ABSTRACT OF THE DISCLOSURE

Structural improvements in plastic trays designed for meats and the like, consisting of (1) a rounded, reinforced corner having an inturned strengthening bend, (2) rib end portions formed in and terminating below the tops of flanged sides to enhance sidewall rigidity, and (3) upward projections in the base of the tray to maintain the product spaced from the base. The tray may be made of a transparent material.

---

This application is a continuation-in-part of copending application Ser. No. 564,131, filed July 11, 1966.

This application relates to a tray, and more particularly to a plastic tray having improved structural properties.

The use of trays to transport items is well known. In recent years trays have been used to hold consumer products such as candy, meat, vegetables, etc. The assembly of such items in any open top tray usually permits sufficient examination of the contents to meet the demands of a potential purchaser. Unfortunately, with opaque trays, meat, poultry, fish and the like, which may vary widely in quality throughout a particular piece, cannot be examined entirely to the purchaser's satisfaction, since the side resting on the tray, which may be the less desirable side, cannot be seen. When the trays are made of paper, fiberboard or of pulp material, natural juices exuding from the packaged product settle in the tray and may render it unsightly, soggy and weak. When the product is meat, and the tray is impervious, the healthy bloom of the meat is often destroyed where large areas of it contact the tray surface.

Also, use of trays has been limited primarily by their weight, and by the cost of the material used for their construction. Though some plastic trays have been manufactured, it has been a recurring problem to develop tray geometry for imparting strength to an initially flexible sheet from which the tray is formed, while keeping the amount of plastic used in it at a minimum. On the other hand, excessive reduction of the fabricating material generally tended to make the tray too weak, or susceptible to bending particularly when held along an edge, or when being overwrapped with film material. Anything in excess of gentle handling during the packaging operation often resulted in ripping the overwrap and/or splitting the tray.

Structural deficiencies have been solved to a certain extent by the integral, ribbed weave design described in my copending application Ser. No. 564,131, filed July 11, 1966. Further improvements have since been developed, however, which enhance to a greater extent the structural stability of trays in general, as well as make them unusually adaptable to the packaging of meat products and the like. These improvements are particularly pertinent to the type tray described in my copending application mentioned above.

Accordingly, it is an object of this invention to provide a tray which avoids the prior art deficiencies discussed above.

It is an additional object of the present invention to provide structural improvements in a plastic tray.

It is another object of the present invention to provide a tray thermoformed from flexible sheet material, yet strong enough to contain relatively heavy items and withstand severe handling without damage, while at the same time employing a minimum of material in its construction.

It is another object of the present invention to provide a thermoformed plastic tray having improved resistance to bending, particularly when the tray is held along one edge while supporting a comparatively heavy item.

It is a still further object of this invention to provide an improved plastic tray for holding meats and the like, while retaining them in a non-deteriorating manner.

Other objects of this invention will in part be obvious and will in part appear hereinafter.

These and other objects are attained by providing a one-piece, thin wall, seamless, plastic tray comprising a bottom, a plurality of sides extending up from the periphery of the bottom, and a reinforced rounded corner in the area of the junction of two of the sides, the reinforcement comprising an inturned bend between the bottom and the top edges of the corner. The plastic tray may be transparent, may have a plurality of spaced primary strengthening ribs integral with, projecting upwardly from, and extending across the bottom in one direction, within the sides of the tray, and a plurality of spaced secondary strengthening ribs integral with, projecting upwardly from, and extending across the bottom within the tray sides in a direction substantially perpendicular to the direction of the primary ribs, the maximum height of the ribs being less than that of the sides. The tray may further include a plurality of supporting projections formed in the base between the strengthening ribs. The primary and secondary ribs may have end portions formed in, and extending partially up along the tray sides terminating below the upper edges, to provide sidewall rigidity.

In describing the overall invention reference will be made to the accompanying drawings in which:

FIGURE I is a plan view of a tray constructed in accordance with the present invention;

FIGURE II is a side, elevational view taken along the line II—II of FIGURE I;

FIGURE III is a sectional, perspective view of a corner of the tray of FIGURE I;

FIGURE IV is a sectional, perspective view of a central portion of the tray of FIGURE I, illustrating a supporting projection;

FIGURE V is a sectional, perspective view taken along the line V–V of FIGURE I; and FIGURE VI is a sectional, perspective view of a side portion of the tray of FIGURE I, illustrating the rib design in the base area adjacent the sides.

With reference to the drawings, wherein identical numerals refer to identical parts, there is shown in FIGURES I and II a one-piece, thin wall, seamless, shallow, plastic tray 10 comprising a bottom 12, a plurality of sides 14 and 16 extending upwardly and tapering slightly outwardly from the periphery of bottom 12, and a reinforced rounded corner 24 in the area of the junction of two of the sides. Tray 10 may be of a generally rectangular shape wherein sidewalls 14 and 16 are opposed, and joined therebetween by a pair of opposed shorter sides or endwalls which also extend upwardly and outwardly from the periphery of base 12, one of which is typically shown as 18 in FIGURE II. The shallowness of the tray is measured by the height of the tray sides, which may range between $3/16$ to 2 inches. Flange 22 projects outwardly in relation to the sides, and in FIGURES I and II it projects outwardly from the top of sides 14, 16 and 18 around the periphery of the tray body. Tray 10 may further comprise a plurality of spaced primary strengthening ribs 42 integral with, projecting upwardly from, and extending across bottom 12 within the sides in one direction, preferably the direction of maximum extent, i.e., that of sides 14 and 16, and a plurality of spaced secondary strengthening ribs 44 integral with, projecting upwardly from, and extending across the bottom which the tray sides in a direction substantially perpendicular to the direction of primary ribs 42. Use of secondary ribs in conjunction with the primary ribs is optional and may at times be unnecessary. Primary and secondary ribs 42 and 44 are hollow as depicted in FIGURE II to conserve material. The maximum height of the primary and secondary ribs is always less than that of the sides, and preferably is between about 0.1 to 0.75 times the maximum height of a side. Further details as to the intermeshing relationship of primary and secondary ribs 42 and 44 across base 12 of tray 10 may be found in my copending application Ser. No. 564,131, filed July 11, 1966.

As a feature of the present invention, there is shown in enlarged form in FIGURE III, reinforced, rounded corner 24, located in the circular, segmental area of the junction of sides 16 and 18. Corner 24 comprises rounded ends 26 and 28 and bend 30 inturned toward the center of the tray, and located between the bottom edge 32 and the top edge 34 of corner 24. Corner 24 further comprises curved extension 36 between the inner edge 38 of inturned bend, 30, and lower shelf 40 formed slightly above bottom 12 as shown in FIGURES II and III.

As an additional feature of the present invention, there are also provided, as depicted in FIGURES I and II, a plurality of elongated, supporting hollow projections 46, formed in, and symmetrically positioned across the central portion of bottom 12. Projection 46 as shown in FIG. IV has a generally flat top 50 but could be rounded, if desired, and side and end surfaces typically shown as 52 and 54, tapering outwardly to a base 48, which has a greater cross section than that of top 50. These outwardly tapering surfaces provide additional partial support supplementing that provided by flat top 50 to keep meat portions from sagging into contact with base 12.

Projections 46 are generally utilized when a relatively soft cut of meat is packaged in tray 10, and serves to keep the underside of the meat cut facing bottom 12 which lies within the areas defined by the intersections of ribs 42 and 44, spaced upwardly from bottom 12. Without projections 46, large areas of the soft meat tend to sag against base 12, and become undesirably discolored after a relatively short package shelf life. It is believed that this discoloration is a result of insufficient air circulation across the downside face of the meat. As an additional feature in the design of strengthening ribs 42 and 44 applicable in protecting against entrapment of air within confined areas between the base of the tray and the underside of the meat, the top faces of these ribs are at different elevations above the base, as opposed to lying in a constant plane above the base. This can best be seen from FIGURE VI, for example, where surface 64 of rib 44 is at a greater elevation above base 12 than surface 66 of adjacent rib 44. With this design across the bottom of the tray body, and in conjunction with supporting projections 46, pockets of stagnant air between the meat and the tray base within the rib intersections are kept to a minimum and some air circulation occurs, which tends to preserve the meat bloom.

As another feature of the present invention, there is shown in FIGURES V and VI a configuration which provides enhanced structural stability or resistance to bending, either in the sides or along or adjacent to the base of the sides of tray 10. Primary and secondary ribs 42 and 44 have end extensions 58 which are formed in, and extend partially up along the vertical extent of a side, terminating below the upper edge 62 of side 16 at an undiminished cross sectional area, as depicted by 68 in FIGURE VI. As can be seen by referring to FIGURE V, with this design reinforcing of the tray side occurs in one respect by means of the angle iron like rigidifying beam extending along the entire length of side 16, and comprising (a) surface 60 located between top edge 62 of side 16 and the point of termination 68 of rib extension 58, and (b) flange 22 extending angularly outward from edge 62. Surfaces 60 and 22, wherever they occur in the tray periphery, serve to strengthen the tray along its sides and prevent bending. This is especially important in a rectangular tray which is generally grasped and lifted along its short side, for example by a purchaser, while containing the product therein, i.e., side 18 in FIGURE II, so as to apply a structural bending moment at the joint between the tray base along the long axis and the short side being held. Projecting the ends of the strengthening ribs 42 and 44 completely up to edge 62 would interrupt and therefore eliminate the structural stability provided by this rigidifying beam. Side strength is achieved in another respect by terminating the rib extensions in full cross section as depicted by face 68 in FIGURE VI. This eliminates bend points and consequently prospective cracking areas otherwise present if the end portions 58 tapered to a pointed configuration while blending into the side surfaces.

The pattern of intersection of the primary and secondary ribs 42 and 44, respectively, in the base of the tray adjacent the lower ends of the sides is also important in minimizing the extent to which the sides will bend in and out in the joint line with the base, depicted as 70 in FIG. VI. Prior to extending into the sides, i.e., in the base area adjacent joint line 70 of FIG. VI, at every other intersection of secondary ribs 44 with primary ribs 42 the intersecting portions of ribs 44 join the primary ribs 42 below the tops thereof as shown at 66, whereas at the intersections in the areas intermediate these points the intersecting portions of ribs 44 extend over the top of the primary ribs 42 as depicted at 64. This alternate type of configuration at each intersection of the ribs adjacent the joint line of the base with a side tends to minimize the tendency of a tray side to bend in and out in a direction parallel to itself, and particularly does it tend to minimize bending along the base of a rib adjacent a side, shown typically as the side or rib 42 adjacent tray side 16 in FIG. VI.

The above description and particularly the drawings are set forth for purposes of illustration only and are not to be taken in a limited sense.

The various tray structural improvements of this invention, i.e., the reinforced rounded corner, the manner in which the ribs blend into the tray sides and intersect adjacent the base of the sides, as well as the supporting projections in the tray base, may each be used independently, or in combination with one or more of the others as conditions require. The supporting projections, for example, may be unnecessary when a relatively rigid, bony meat cut is packaged, which might be satisfactorily supported by the reinforcing ribs alone.

The reinforced corner of the present invention provides a change in direction in the tray corner contour in addition to that of the joint between the sidewall and top flange, by means of an inward bend. This bend provides substantially increased rigidity, and without it the corner tends to collapse and crack with all but gentle handling. The inturned bend of the corner may be situated anywhere between the bottom and top edges thereof. It is preferable that it be spaced downward from the upper edge of the corner so that the inward extent of the inturned bend ranges between 0.1 and 2.0 times the extent of the surface located between the bend and the top edge of the corner, and most preferably is about equal to the extent of this surface.

The corner design of the present invention must be rounded, in order to avoid tearing a film overwrap usually applied across the top of the tray and secured to the outside thereof. Rounded corners also permit improved delineation of the corner contour in the molding process over that obtainable in molding a sharp corner. Corners with sharp edges also provide bend points which tend to crack during handling. In general, the radius of curvature of the rounded corners of the present invention range between about 1/16 to 1½ inches, and preferably between ⅛ to 1 inch.

The tray of the present invention is preferably provided with a peripheral flange projecting outwardly in relation to the top of the sides. Such a projecting flange may act as a leg of a bend resisting angle support, and is particularly advantageous in high speed packaging operations, where reciprocating fingers in automatic destacking equipment must engage the nested trays between their flanges to separate the bottom tray from the nested stack. It is obviously also an aid in hand separating trays from stacked piles in manual packaging operations. This flange is likewise important in the molding process, in that accurate definition of the joint between the base and tray sides is difficult to obtain without a gripping surface at the top of the tray during a thermoforming operation. The sidewall flange width may range between 1/16" to ½" and preferably between about 1/16" to ¼".

Enhanced side structural stability of the tray of the present invention is provided by extending strengthening ribs in the base of the tray partially up along the sides, terminating them short of the top edges thereof. The vertical extent of the side surface between the ends of the rib extensions and the top edge of the sides may range between 0.2 to 0.7 times and preferably between 0.4 to 0.6 times that of the extent of outward flare of the top flange of the side, in order to obtain the desired structural effect. The rib extensions as they project up into the tray sides are preferably maintained at about the same cross section as that of the rib portion in the base area adjacent the bottom of a side. In this way bend cracking points at the top edges are eliminated, and the uninterrupted portion of the sides in conjunction with the top flange act as an angle iron like support for the side.

The supporting projections in the base of the tray between the rib intersections may be of any configuration, but preferably are elongated to maximize the support surface, and to blend in with the elongated rib design in the remainder of the tray base, for purposes of styling and eye appeal. The projections have a base cross sectional area in excess of that at the top in order to facilitate complete drawing of the plastic around the defining mold projections during the forming process. With a reverse shape, i.e., a greater cross section at the top than at the bottom, complete drawing of the plastic portions which define the projections, accurately around the corresponding mold parts is generally not possible. Pointed or sharp projections, though operable with certain items, have generally not been found to provide adequate support for lean meat products, and may even undesirably pierce the meat surface. The maximum height of a projection above the tray base should be either less than or equal to the maximum height of any portion of the strengthening ribs, when used in conjunction with such strengthening ribs. The preferred projection shape is an elongated pyramidical design wherein the base area is between about 0.06 to 0.55 square inch and the top surface is between about 0.0039 to 0.05 square inch.

Although the illustrated embodiment is a tray of rectangular shape, and is preferred since maximum use of storage space may be had with this design, it is obvious that the tray may be any of various other shapes, for example, square, oval, round, triangular and the like.

The material from which the tray is formed may be any thermoplastic material capable of being molded in accordance with the previously mentioned design parameters. Thermoplastic materials generally have the advantages of being tough, difficult to break under ordinary circumstances, non-porous to juices and various extracts, and have sufficient strength to be fabricated relatively thinly for economy purposes, since the containers contemplated herein are of the throw-away, non-reusable type. The forming method may be by injection molding though the preferred method is from web stock by any of the well known sheet thermoforming processes such as, for example, pressure differential forming, using vacuum or positive pressure. The resulting tray when formed in this manner is unitary in construction, has no seams, and is of the thin wall variety having a generally uniform wall thickness between about 2 to 80 mils. The various projections when formed integrally in the tray body in this manner are well defined and sturdy, yet hollow, thereby conserving material used in the construction. Usable thermoplastics are polyolefins, such as for example, polyethylene or isotactic polypropylene, polyacrylates, polymethacrylates; polycarbonates, polyvinyl chloride; and polyethylene terephthalates. The preferred materials are styrene copolymers, for instance, styrene-acrylonitrile copolymers, and most particularly is biaxially oriented polystyrene preferred, since even when thin this material is tough and resilient even at low temperatures, and furthermore is generally inert to most foods such that there usually need be no concern that packaged meat, for example, will absorb flavor from the tray. The low temperature stability of styrene copolymers is important in considering the plastic to be used in fabricating the tray of the present invention, since it must be kept in mind that the contents at times may be refrigerated below about 0° F. for extended periods. Some plastics are more brittle and susceptible to fracture than styrene base polymers under these conditions.

When packaging meat products and the like, wherein full examination of the contents is desired by the purchaser, the thermoplastic used in preferably entirely transparent, including that of any overwrap material applied across the top and the outside of the supporting tray. Otherwise the tray may be of any desired color.

In the case of the preferred bioaxially oriented polystyrene material referred to above, the thermoforming operation is generally carried out at temperatures ranging anywhere from 175 to 400° F., utilizing differential pressures to form the sheet material against the wall of a die contoured to affect the design described previously.

In general, the present tray finds particular utility for the packaging of various consumer items such as candy, vegetables, etc., and meat products in particular. Structural stability is provided by geometrical designs which permit converting an initially flexible plastic sheet into a sturdy, bend resistant tray, utilizing a minimum of material for its construction, while minimizing the crack susceptible bend points in the body of the container. In most instances, a film overwrap which may be of transparent plastic, is employed with the tray of the present invention, to protect the contained items from detrimental effects of exposure to the environments. Furthermore, the package is attractively symmetrical in appearance, and has unique adaptability to high speed forming and packaging operations.

It will be understood that many variations and modifications of the embodiments herein described will be obvious to those skilled in the art, and may be carried out without departing from the spirit and scope of the invention as hereinafter claimed.

What is claimed is:

1. A two-piece, thin wall, seamless plastic food package comprising a tray having a bottom, a plurality of sides extending up from the periphery of the bottom to an open top, a reinforced rounded corner in the area of the junction of two of said sides, said reinforcement comprising an inturned shoulder between the bottom and top of the corner extending substantially parallel to said rounded corner, the inward extent of said shoulder being equal to 0.1 to 2.0 times the distance between the top of the corner and the tie in of the shoulder to the corner and a film covering tightly secured to said tray for closing the open top of said tray, said package having a thickness of between about 2 to 80 mils, whereby said shoulder minimizes movement toward each other of portions of the sides of said tray adjacent said corner during application of said covering to said tray, thereby avoiding cracking of the plastic in said corner area.

2. The structure of claim 1 wherein the tray is of a generally rectangular shape.

3. The tray of claim 1, including a peripheral flange extending outwardly from the tops of said sides.

4. A one-piece, thin wall, transparent, seamless, shallow plastic tray for meats and the like, comprising a bottom, sides extending upwardly and outwardly from the periphery of the bottom, a plurality of spaced, intersecting reinforcing ribs integral with, projecting upwardly from and extending across the bottom within the sides, said ribs having a maximum height less than that of the sides, and a plurality of supporting projections between the ribs, integral with the bottom and spaced from the points of intersection of the ribs, at least some of said projections being situated in the central area of the tray, said projections serving to keep portions of a piece of meat or the like in the tray between the ribs from sagging into contact with the bottom of the tray.

5. The tray of claim 4 wherein the cross-sectional area of the base of the projections is greater than at the top.

6. A thin wall, thermoformed, transparent meat tray of biaxially oriented polystyrene, comprising a bottom, sides projecting upwardly and outwardly around the periphery of the bottom, a plurality of primary strengthening ribs projecting up from and integral with the base, extending across the base in one direction, a plurality of secondary strengthening ribs projecting up from and integral with the base extending across the base in a direction substantially perpendicular to the direction of the primary ribs, the maximum height of said ribs being about 0.1 to 0.75 times that of the sides, and a plurality of supporting elongated projections positioned on the base between the intersections of the primary and secondary ribs.

7. The tray of claim 6 wherein the maximum height of a projection above the base is less than the maximum height of any portion of said ribs.

8. The tray of claim 6 wherein the height of a projection above the base is about equal to the maximum height of any portion of said ribs.

9. The tray of claim 6 wherein the projections are hollow.

10. A one-piece, thin wall, seamless, shallow plastic tray of generally rectangular shape, comprising a base, a pair of opposed sidewalls, a pair of opposed endwalls, and pair of opposed sidewalls, a pair of opposed endwalls, said sidewalls and endwalls extending upwardly from the periphery of the base, a peripheral flange extending outwardly from the upper ends of the sidewalls from the upper ends of the sidewalls and endwalls, a plurality of primary strengthening ribs integral with an projecting upwardly from the base extending across the base perpendicular to the endwalls, a plurality of secondary strengthening ribs integral with and projecting upwardly from the base extending across the base perpendicular to the sidewalls, said primary and secondary ribs having end portions which are formed in and extend partially upwardly along the sidewalls and endwalls terminating below the upper edges thereof, the distance between the upper ends of the rib end portions and the upper edges of the sidewalls and endwalls being between about 0.2 and 0.7 times the outward extent of the peripheral flange.

11. The tray of claim 10 wherein the distance between the upper ends of the rib end portions and the upper edges of the sidewalls and endwalls is about equal to the width of the peripheral flange.

12. A one-piece, thin wall, seamless, shallow transparent plastic meat tray, comprising a bottom, a pair of opposed sidewalls, a pair of opposed endwalls of shorter length than the sidewalls, said sidewalls and said endwalls extending upwardly and outwardly from the periphery of the bottom, an outwardly extending peripheral flange at the upper ends of the sidewalls and endwalls, reinforced rounded corners in the area of the junctions of said sidewalls with said endwalls, said reinforcement comprising an inturned shoulder between the bottom and top edges of said corners, a plurality of primary strengthening ribs integral with and projecting upwardly from the bottom extending substantially perpendicular to the endwalls, a plurality of secondary strengthening ribs integral with and projecting upwardly from the bottom extending substantially perpendicular to the sidewalls, said primary and secondary ribs having end portions which are formed in and extend partially up the sidewalls and endwalls terminating below the upper edges thereof, the cross sections of the end portions at the point of termination being about the same as that of the extensions, and a plurality of elongated supporting projections between the intersections of the ribs, integral with the bottom of the tray and spaced from the sides of the ribs.

13. The tray of claim 1 including a base portion in the corner area which is elevated above the remainder of the base to form a shelf, the outer edge of said shelf adjacent the periphery of the tray being parallel to said rounded corner.

References Cited

UNITED STATES PATENTS

| | | | |
|---|---|---|---|
| 2,703,185 | 3/1955 | Cook | 229—2.5 XR |
| 2,918,379 | 12/1959 | Lurie | 229—2.5 XR |
| 2,967,654 | 1/1961 | Palmer | 229—35 |
| 3,127,698 | 4/1964 | Smithers | 229—2.5 XR |
| 3,184,047 | 5/1965 | Gilman et al. | 229—2.5 XR |
| 3,233,812 | 2/1966 | Kennedy | 229—2.5 |
| 3,268,144 | 8/1966 | Gaunt | 220—74 XR |
| 3,307,739 | 3/1967 | Cloyd et al. | 220—72 XR |
| 3,311,257 | 3/1967 | Puente | 220—97 |

DAVIS T. MOORHEAD, *Primary Examiner.*

U.S. Cl. X.R.

220—72, 74, 97

UNITED STATES PATENT OFFICE
CERTIFICATE OF CORRECTION

January 9, 1969

Patent No. 3,420,431

Donald W. Donovan

It is certified that error appears in the above identified patent and that said Letters Patent are hereby corrected as shown below:

Column 4, line 67, "0.1 and 2.0" should read -- 0.1 to 2.0 --. Column 6, line 35, "in" should read -- is --; line 39, "bioaxially" should read -- biaxially --. Column 7, lines 3 and 4, cancel "and pair of opposed sidewalls, a pair of opposed endwalls,".

Signed and sealed this 17th day of March 1970.

(SEAL)
Attest:

Edward M. Fletcher, Jr.
Attesting Officer

WILLIAM E. SCHUYLER, JR.
Commissioner of Patents